(12) United States Patent
Wachi et al.

(10) Patent No.: US 6,315,371 B1
(45) Date of Patent: Nov. 13, 2001

(54) BRAKE SYSTEM

(75) Inventors: Yuzi Wachi; Toshiaki Fukushima, both of Higashimatsuyama (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/421,362

(22) Filed: Oct. 19, 1999

(30) Foreign Application Priority Data

Nov. 16, 1998 (JP) .................................. 10-325192

(51) Int. Cl.[7] ...................................................... B60T 8/60
(52) U.S. Cl. ..................... 303/155; 303/11; 303/113.4; 303/115.4; 303/166
(58) Field of Search ................................ 303/115.4, 161, 303/166, 167, 113.4, 155, 10, 11

(56) References Cited

U.S. PATENT DOCUMENTS

| | | | |
|---|---|---|---|
| 4,812,777 | * | 3/1989 | Shirai ........................................ 303/14 |
| 5,171,071 | * | 12/1992 | Takata et al. ....................... 303/113.2 |
| 5,172,962 | * | 12/1992 | Takata ............................. 303/113 TR |
| 5,230,549 | * | 7/1993 | Osada et al. ............................... 303/3 |
| 5,246,283 | * | 9/1993 | Shaw et al. ......................... 303/115.2 |
| 5,261,730 | * | 11/1993 | Steiner et al. ...................... 303/113.4 |
| 5,558,409 | * | 9/1996 | Walenty et al. ......................... 303/10 |
| 5,567,021 | * | 10/1996 | Gaillard .................................... 303/3 |
| 5,613,740 | * | 3/1997 | Kawamoto et al. ..................... 303/11 |
| 5,720,534 | * | 2/1998 | Stumpe ................................. 303/166 |
| 5,729,979 | * | 3/1998 | Shaw et al. ............................. 60/533 |
| 5,816,667 | * | 10/1998 | Jokic ................................. 303/113.4 |
| 5,890,776 | * | 4/1999 | Sawada ............................. 303/116.1 |
| 5,941,608 | * | 8/1999 | Campau et al. ................... 303/113.4 |
| 5,947,566 | * | 9/1999 | Tobisawa et al. ................ 303/114.1 |
| 5,984,433 | * | 11/1999 | Stumpe et al. ........................ 303/155 |
| 6,079,793 | * | 6/2000 | Takayama et al. ..................... 303/14 |
| 6,099,086 | * | 8/2000 | Feigel et al. ....................... 303/113.4 |
| 6,105,737 | * | 8/2000 | Weigert et al. ....................... 188/158 |
| 6,135,572 | * | 10/2000 | Worsdorfer et al. .................... 303/10 |
| 6,135,575 | * | 10/2000 | Feigel et al. ....................... 303/113.4 |
| 6,139,119 | * | 10/2000 | Otomo .............................. 303/113.1 |

* cited by examiner

Primary Examiner—Christopher P. Schwartz
Assistant Examiner—Benjamin A. Pezzlo
(74) Attorney, Agent, or Firm—Kanesaka & Takeuchi

(57) ABSTRACT

In a brake system, a controller closes solenoid shut-off valves to shut off a communication between a master cylinder and wheel cylinders by pressing a brake pedal, and at the same time, drives a pump and controls the operation of brake fluid pressure control means to supply brake fluid through the pump to the wheel cylinders, thereby performing braking action. Idle travels of the wheel cylinders can be cancelled by the brake fluid from the pump, and a very short pedal stroke can be obtained. Since the brake characteristics are set by considering three factors, i.e. pedal characteristics, travel of a brake pedal, and deceleration (brake fluid pressure) of a vehicle, the brake system has a very short stroke of the brake pedal as compared to a conventional one and has optimal brake characteristics.

20 Claims, 7 Drawing Sheets

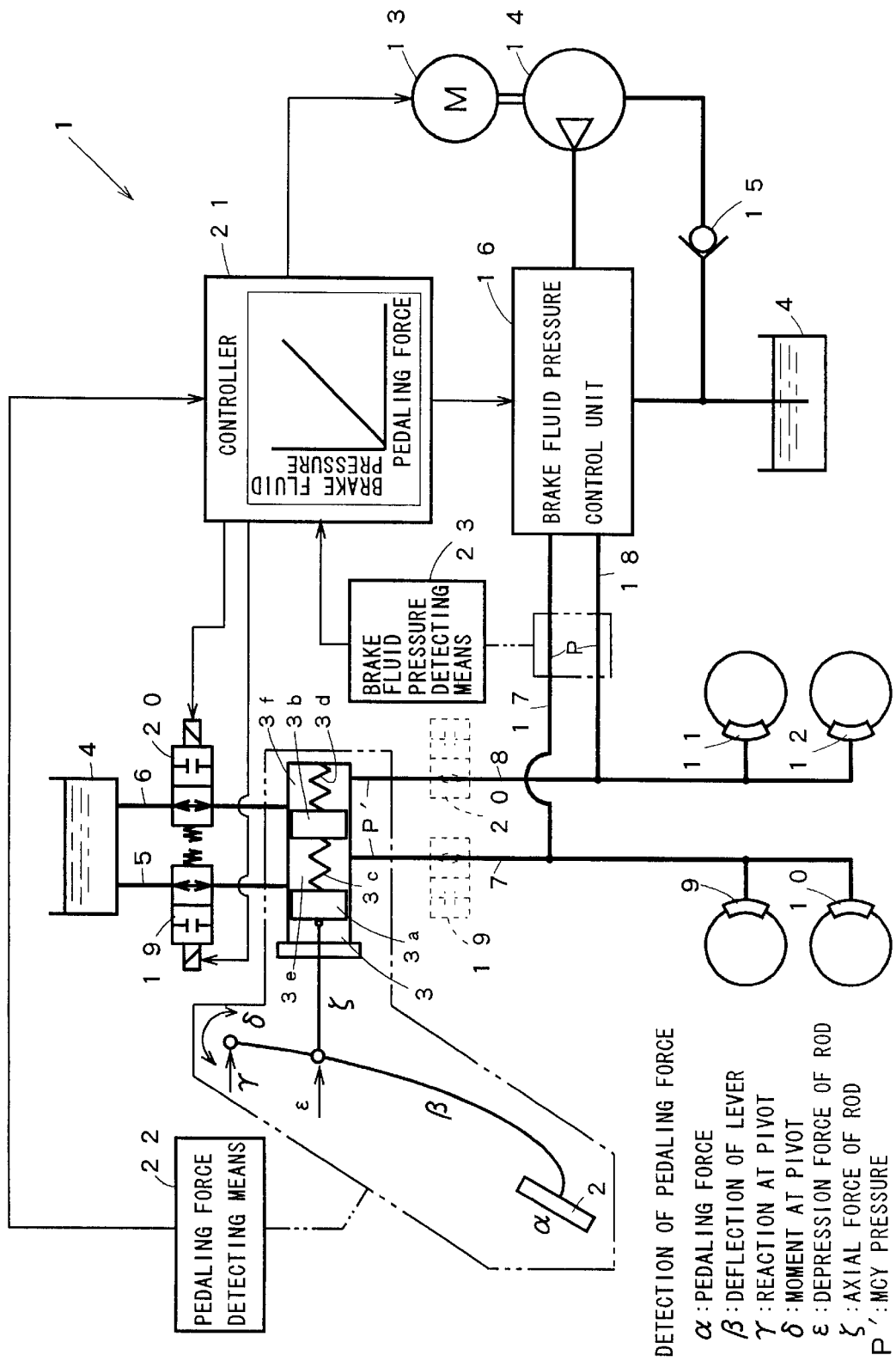

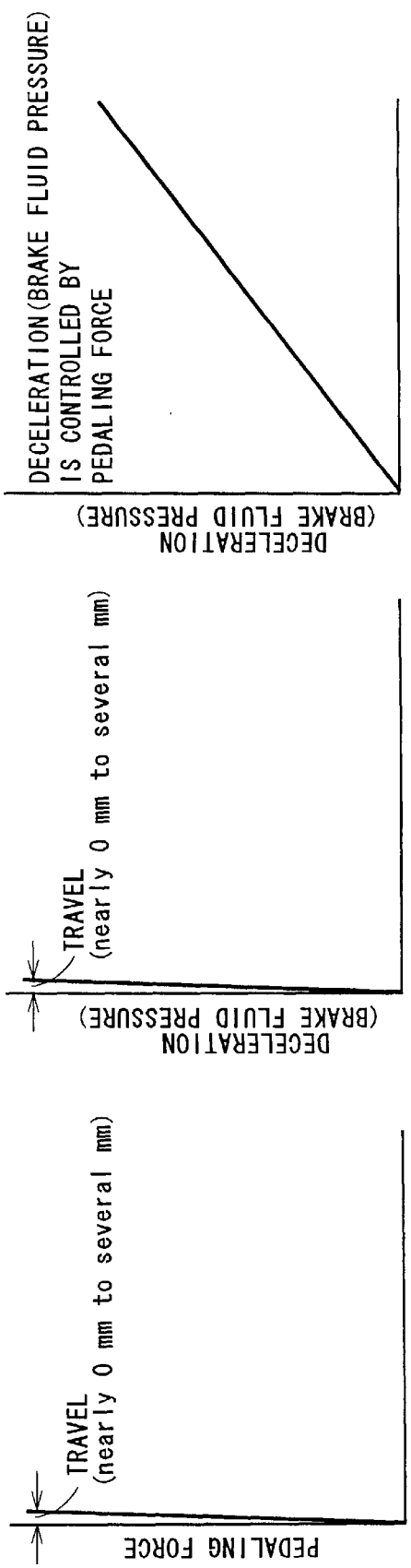
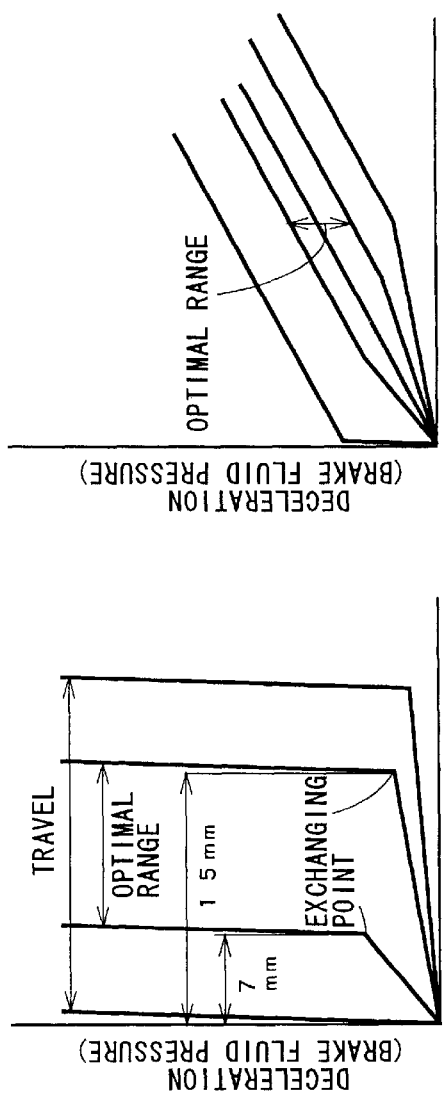
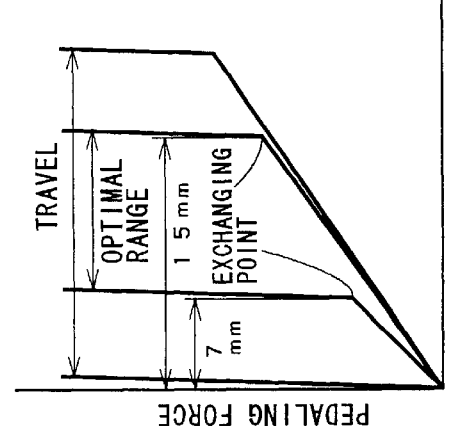
Fig. 2(a), Fig. 2(b), Fig. 2(c), Fig. 2(d), Fig. 2(e), Fig. 2(f)

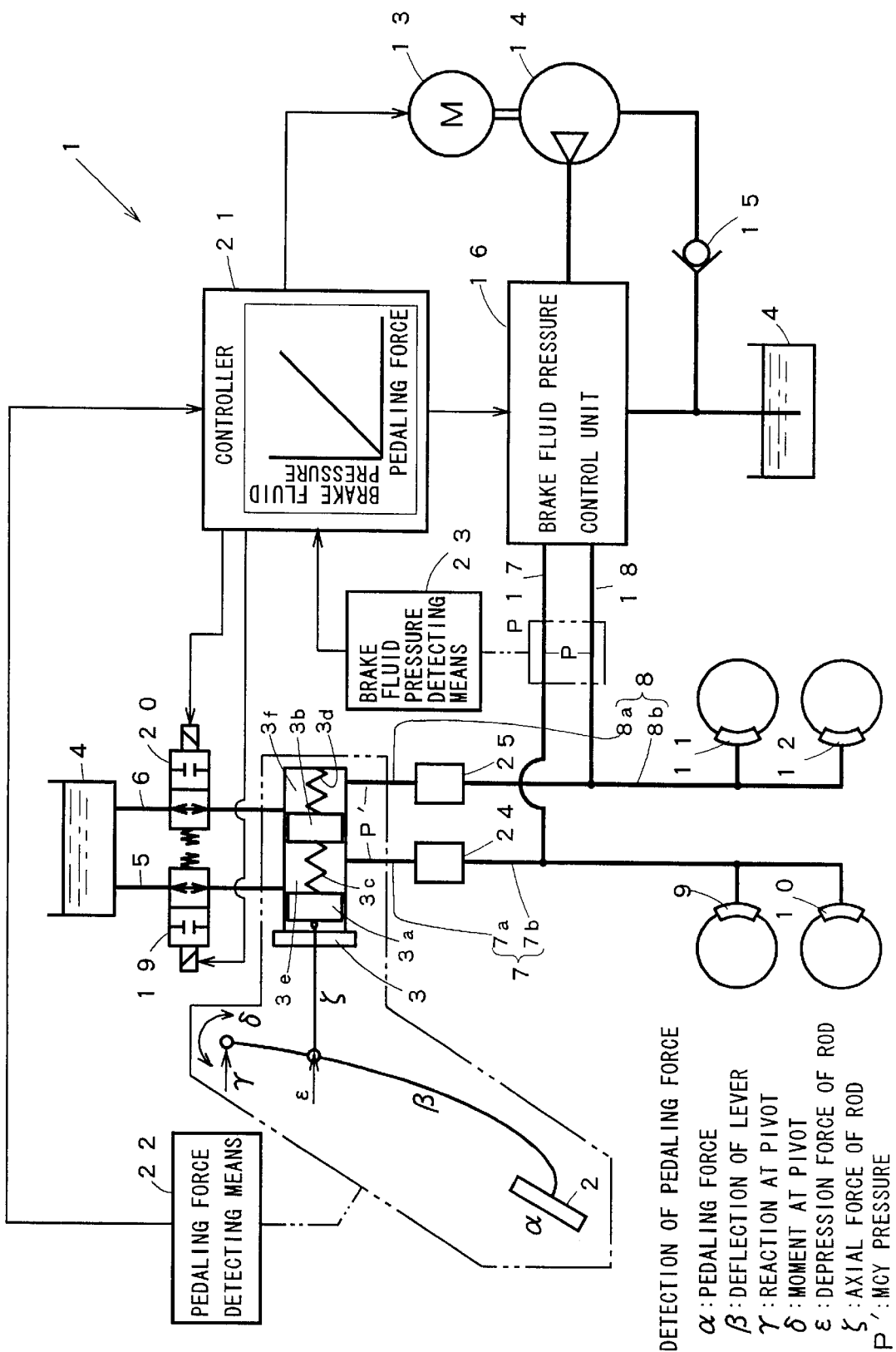

BRAKE SYSTEM

BACKGROUND OF THE INVENTION

The present invention relates to a technical field of a brake system in which a master cylinder (hereinafter, sometimes referred to as "MCY") is operated by a press of a brake pedal to develop fluid pressure (hereinafter, sometimes referred to as "MCY pressure") which actuates a brake cylinder, performing braking operation and, more particularly, to a technical field of a brake system which is designed to have a very short stroke of a brake pedal as compared to a conventional one and has suitable braking characteristics.

Among brake systems for automobiles, a brake system in which the braking action is carried out by fluid pressure converted from a pedaling force exerted on a brake pedal is well employed. FIG. 9 is a schematic view of the basic construction of such a conventional brake system using fluid pressure. In FIG. 9, numeral "a" designates a brake system, "b" designates a brake pedal for braking operation, "c" designates a tandem-type master cylinder (MCY) for generating brake fluid pressure, "d" designates a primary piston of the MCY c, "e" designates a secondary piston of the MCY c, "f" and "g" designate return springs, "h" designates a primary fluid pressure chamber of a first brake circuit, "i" designates a secondary fluid pressure chamber of a second brake circuit, "j" designates a reservoir for storing brake fluid, "k" designates a primary-side fluid line for the brake fluid between the primary fluid pressure chamber f and the reservoir j, "m" designates a secondary-side fluid line for the brake fluid between the secondary fluid pressure chamber i and the reservoir j, "n" designates a brake fluid pressure line in the first brake circuit, "o" designates a brake fluid pressure line in the second brake circuit, "p" and "q" designate wheel cylinders (hereinafter, sometimes referred to as "WCY") in the first brake circuit, and "r" and "s" designate WCYs in the second brake circuit.

As shown in FIG. 9, in this brake system a, the primary piston d of the MCY c is advanced (to the left in FIG. 9) from the illustrated inoperative position by a pedaling force exerted on the brake pedal b. As a sealing portion (not shown) of the primary piston d passes an opening $k_1$ (for communication with the primary fluid pressure chamber h of the MCY c) of the primary-side fluid line k and further advances, MCY pressure is developed in the primary fluid pressure chamber h. By this MCY pressure, the secondary piston e advances so that a sealing portion (not shown) of the secondary piston e passes an opening $m_1$ of the secondary fluid line m and further advances, MCY pressure is developed in the secondary fluid pressure chamber i. These MCY pressure is introduced into the WCYs p, q and r, s through the brake fluid pressure lines n and o, respectively, thereby carrying out the braking action.

In this brake system a, as mentioned above, the pedaling force exerted on the brake pedal b is converted to the fluid pressure by the MCY c and the WCYs p, q and r, s are actuated by the fluid pressures, thus carrying out the braking action.

As for brake systems, recently, it is desired to design the stroke of a brake pedal as shorter as possible in a view of the facility of the braking operation.

In the aforementioned brake system, however, a predetermined amount of brake fluid must be sent from the MCY c to the brake circuits until fluid pressures are developed after the sealing portions of the pistons d, e pass the openings $k_1$, $m_1$ of the respective fluid lines communicating with the reservoir j, due to the idle distances of the WCYs p, q and r, s, and so on. Accordingly, the pistons d, e must advance largely in order to send the predetermined amount of brake fluid. Since this action does not directly actually develop the fluid pressures, this action is idle travel. The stroke of each piston d, e includes the travel from the inoperative position to a position where the sealing portion passes the openings $k_1$, $m_1$ of the fluid lines k, m communicating with the reservoir j and the idle travel, i.e. a large stroke. As a result of this, the pedal stroke of the brake pedal d is inevitably large. Concretely, the pedal stroke of the conventional brake pedal is generally in a range from 60 mm to 80 mm, even the shortest one is about 40 mm.

The above mentioned desire for designing the stroke of a brake pedal as short as possible can not be sufficiently fulfilled by the conventional brake system.

Brake characteristics of a vehicle including (i) feeling of braking, (ii) feeling of response, and (iii) feeling of pedaling are determined by three factors: (1) pedal characteristics, (2) travel of a brake pedal, and (3) deceleration (brake fluid pressure) of the vehicle. When the shortening of the pedal stroke is enabled, it is desired to optimize the brake characteristics by taking these three factors into consideration.

SUMMARY OF THE INVENTION

It is an object of the present invention to provide a brake system which can be set to have a very short stroke of a brake pedal as compared to a conventional one and has optimal braking characteristics.

For accomplishing this object, a brake system of the present invention comprises: a brake pedal which travels by pedaling force applied to the brake pedal, a reservoir for storing brake fluid, a master cylinder which communicates with the reservoir when it is inoperative and is shut off from the reservoir so as to develop fluid pressure when it is actuated by the press of said brake pedal, and brake cylinders which are connected to said master cylinder and are actuated by the fluid pressure of the master cylinder, wherein said pedaling force is converted to the fluid pressure by said master cylinder and said brake cylinders are actuated by the fluid pressure, and said brake system further comprises: shut-off means for shutting off the communication between said master cylinder and said brake cylinders, brake fluid supply means for supplying the brake fluid to lines between said brake cylinders and said shut-off means, brake fluid pressure control means for controlling the supply of the brake fluid from brake fluid supply means to said lines and for controlling the fluid pressure in said brake cylinders, and a central processor for controlling said shut-off means based on the operation of said brake pedal in such a manner that said shut-off means allows the communication between said brake cylinders and said reservoir when the brake pedal is inoperative and shuts off the communication between said brake cylinders and said reservoir when said brake pedal is operative and, in addition, for controlling said brake fluid pressure control means based on the pedaling force in such a manner that said brake fluid pressure control means stops the supply of the brake fluid from said brake fluid supply means to said lines when said brake pedal is inoperative and allows the supply of the brake fluid from said brake fluid supply means to said lines and adjusts the fluid pressure in said brake cylinders according to the predetermined relation between said pedaling force and the outputs of said brake cylinders when said brake pedal is operative. In this brake system, the central processor controls said shut-off means and said fluid pressure control means to obtain rising characteristics of braking action having a characteristic point with a deceleration of a vehicle 0.08–0.12G when the pedaling force is 15–25N and the travel of the brake pedal is 7–15 mm.

According to the present invention, the characteristics between the pedaling force and the deceleration of the vehicle are provided with a jumping function to develop a predetermined deceleration when the travel of the brake pedal reaches the rising point of the deceleration of the vehicle.

In addition, according to the present invention, the characteristics between the pedaling force and the deceleration of the vehicle after said characteristic point are provided with linear characteristics.

In addition, according to the present invention, the brake system has brake characteristics of preventing the brake pedal from traveling after said characteristic point.

In addition, according to the present invention, the rising characteristics of the braking action have a characteristic point with a deceleration of the vehicle 0.1G when the pedaling force is 20N and the travel of the brake pedal is 10 mm and, after said characteristic point, linear characteristics indicated by a line connecting the characteristic point and a point with a pedaling force 200N and a deceleration 1.0G.

In addition, according to the present invention, the pedaling force is set to be 20N or more at the rising point in case of a vehicle having oversensitive response in a low deceleration range before the characteristic point with the deceleration of the vehicle 0.08–0.12G.

In addition, according to the present invention, the pedaling force is set to be 20N or less at the rising point in case of a vehicle having insensitive response in a low deceleration range before the characteristic point with the deceleration of the vehicle 0.08–0.12G.

In addition, according to the present invention, when the speed of increase in said pedaling force exceeds a predetermined value, the speed of increase in the deceleration of the vehicle is lowered in case that the vehicle has oversensitive response, or the speed of increase in the deceleration of the vehicle is increased in case that the vehicle has insensitive response.

In addition, according to the present invention, the speed of increase in the deceleration of the vehicle is changed by changing the arithmetic value for pedaling force, for example, decreasing the arithmetic value as the speed of increase in the pedaling force becomes higher, or changing the inclination of the characteristics between the pedaling force and the deceleration of the vehicle.

In addition, according to the present invention, the speed of increase in the deceleration of the vehicle is changed according to the speed of increase in the pedaling force.

In addition, according to the present invention, the build-up characteristics are provided such that the deceleration of the vehicle is increased by a predetermined value when the speed of increase in the pedaling force returns a predetermined speed after exceeding said predetermined speed.

In addition, according to the present invention, the inclination of the linear characteristics between the pedaling force and the deceleration of the vehicle is changed according to the vehicle speed.

In addition, according to the present invention, the amount of build-up of the build-up characteristics between the pedaling force and the deceleration of the vehicle is changed according to the vehicle speed.

In addition, according to the present invention, the inclination of build-up of the build-up characteristics between the pedaling force and the deceleration of the vehicle is changed according to the vehicle speed.

In the brake system of the present invention structured as stated above, the communication between a master cylinder and brake cylinders is shut off by shut-off means when a brake pedal is pressed. Then, brake fluid is supplied from brake fluid supply means to lines between the shut-off means and the brake cylinders whereby idle travels in these lines and the brake cylinders are cancelled and the fluid pressure of the brake cylinders is controlled by a brake fluid pressure control means according to the predetermined relation between the pedaling force and the output of the brake cylinders.

In this manner, the idle travels can be cancelled with the brake fluid from the brake fluid supply means, thereby significantly shortening the pedal stroke of the brake pedal so as to obtain a very short stroke.

Since the brake characteristics are set considering three factors: the pedal characteristics, the travel of a brake pedal, and the deceleration (brake fluid pressure) of a vehicle, the brake system has optimal brake characteristics.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a diagram for explaining a first basic principle of a brake system according to the present invention, FIGS. 2(a)–2(f) are graphs illustrating respective characteristics of the brake system shown in FIG. 1, FIG. 3 is a diagram for explaining a second basic principle of the brake system according to the present invention.

DESCRIPTION OF THE PREFERRED EMBODIMENTS

Figure 4:
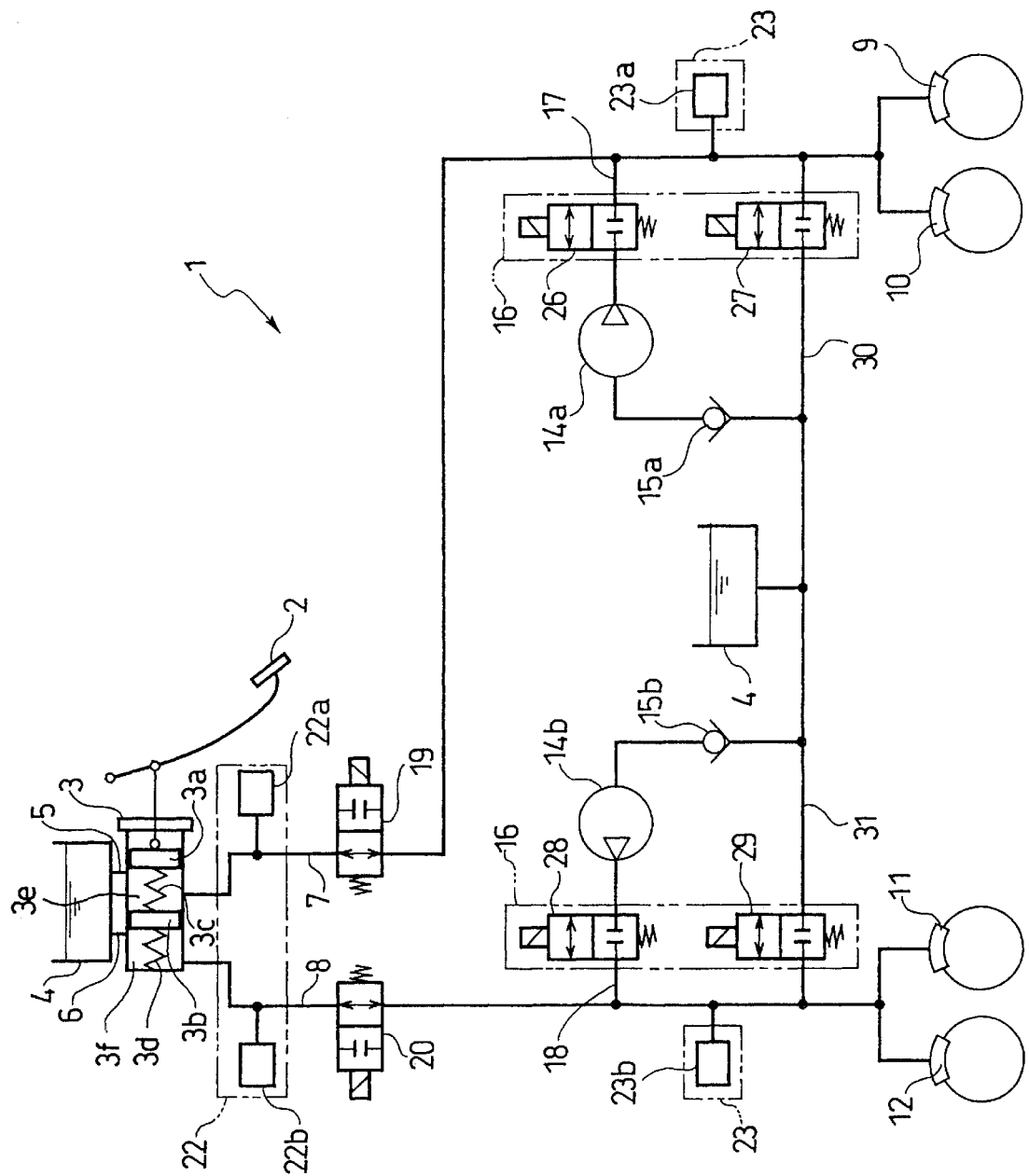
FIG. 4 is a schematic diagram showing an example of an embodiment of the brake system according to the present invention.

Hereinafter, an embodiment of the present invention will be described with reference to the drawings.

FIG. 1 and FIG. 3 are diagrams illustrating basic principles of the brake system according to the present invention. In FIG. 1 and FIG. 3, the same components are marked by the same reference numerals.

Figure 9:
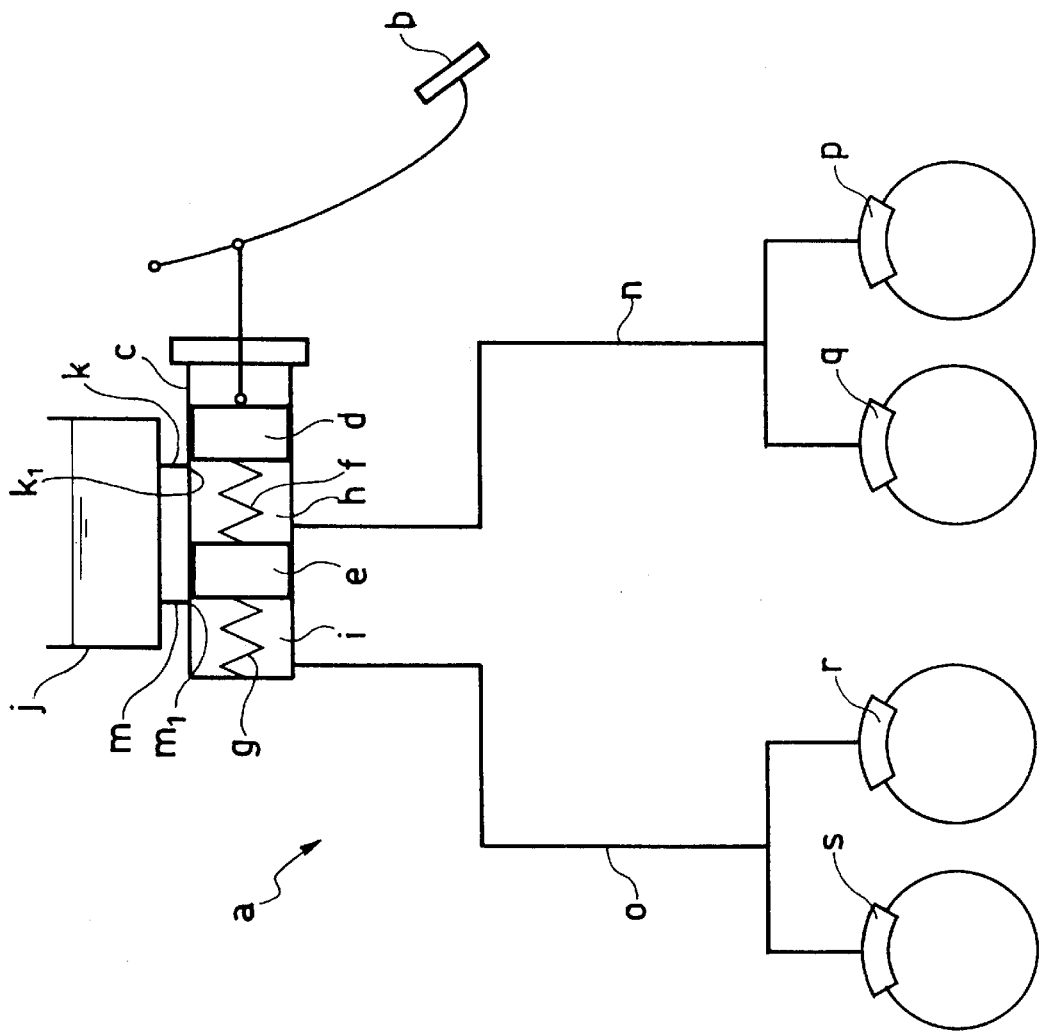
FIG. 9 is a diagram showing a conventional brake system.

First, a description will be made as regard to the first principle of the brake system 1 of the present invention. As shown in FIG. 1, the brake system 1 comprises, just like the conventional brake system a shown in FIG. 9, a brake pedal 2 corresponding to the input means of the present invention, a tandem-type MCY 3 corresponding to the fluid pressure developing means of the present invention, a reservoir 4 for storing brake fluid, brake fluid lines 5, 6 between the MCY 3 and the reservoir 4, fluid pressure lines 7, 8 for first and second brake circuits, and WCYs 9, 10; 11, 12 for first and second brake circuits corresponding to the brake cylinders of the present invention. The MCY 3 is the same as the conventional MCY c and comprises, just like the conventional MCY c, primary and secondary pistons 3a, 3b, return springs 3c, 3d, and fluid pressure chambers 3e, 3f of the first and second brake circuits. The fluid line 5 and the fluid pressure line 7 of the first brake circuit communicate with the primary fluid pressure chamber 3e, and the fluid line 6 and the fluid pressure line 8 of the second brake circuit communicate with the secondary fluid pressure chamber 3f.

In the brake system 1 of the present invention, brake fluid stored in the reservoir 4 is sucked through a check valve 15 by a pump 14 driven by a motor 13 as a brake fluid supply means and is supplied to the fluid pressure lines 7, 8 and then the WCYs 9, 10, 11, 12 through brake fluid supply lines 17, 18, respectively so that brake fluid pressure is developed in the WCYs 9, 10, 11, 12. In this case, the brake fluid pressure P in the WCYs 9, 10, 11, 12 is controlled by a brake fluid pressure control unit 16 as the brake fluid pressure control means according to the pedaling force as described later.

Arranged on the ways of the brake fluid lines 5, 6 are solenoid shut-off valves 19, 20, as the shut-off means, each having an open position and a close position. These solenoid shut-off valves 19, 20 are normally open so that the valves are set in the open position as illustrated in inoperative state.

The brake fluid pressure control unit 16, the solenoid shut-off valves 19, 20, and the motor 13 driving the pump 14 are controlled by a controller 21 as the central processor.

At the same time that a pedaling force on the brake pedal is detected by a pedaling force detecting means 22, a brake fluid pressure P controlled by the brake fluid pressure control unit 16 is detected by a brake fluid pressure detecting means 23. Both of the detected pedaling force and the detected brake fluid pressure P are inputted into the controller 21. The controller 21 controls the operation of the brake fluid pressure control unit 16 in such a manner that the brake fluid pressure control unit 16 controls to set the brake fluid pressure P to a value corresponding to the pedaling force based on the inputted pedaling force and the brake fluid pressure, in accordance with the predetermined relation between the pedaling force and the brake fluid pressure (pedaling force-fluid pressure relation).

Employed as the detection of the pedaling force on the brake pedal includes the detection of a pedaling force a applied by a driver to the brake pedal 2, the detection of a deflection β of a brake lever, the detection of a reaction γ at the pivot of the brake lever, the detection of a moment δ at the pivot of the brake lever, the detection of a depression force ε applied by the brake lever to a rod connecting the brake lever and the piston of the MCY 3, and the detection of an axial force ζ of the rod. These forces may be detected by sensors such as a pedaling load sensor, a load cell, a piezoelectric element, and the like. The deflection β, the reaction γ, the moment δ, the depression force ε, and the axial force ζ do not directly indicate the pedaling force. However, since these have respective predetermined relations with the pedaling force, each of them can be employed as an indication of the pedaling force as a substitute of the pedaling force α itself.

The relation between the pedaling force and the MCY pressure has hysteresis between the actuating operation and the returning operation because of the frictional resistance of the brake pedal 2 and the frictional resistance of the pistons of the MCY 3. Accordingly, the relation between the pedaling force and the deceleration (brake fluid pressure) is not linear. If the brake fluid pressure is controlled based on the detected MCY pressure, the control which is linear relative to the pedaling force is impossible. For achieving the control which is linear to the brake pressure, it is therefore desired to control the brake pressure with the pedaling force detected at the brake pedal 2 or at a portion as nearer to the brake pedal 2 as possible.

The brake fluid pressure may be detected by detecting the brake fluid pressure of either one of the brake fluid lines 17, 18 or by detecting the brake fluid pressure of both the brake fluid lines 17, 18.

The relation between the pedaling force and brake fluid pressure that is previously set is given by the following equation:

$$P > (\epsilon - F\ spg)/A \tag{1}$$

In the above equation, "ε" is the aforementioned depression force having a relation with the pedaling force, "P" is the brake fluid pressure, "F spg" is the spring force of the return spring for biasing the primary piston, and "A" is the effective pressure receiving area of the primary piston. It should be noted that the primary piston and the secondary piston are set to have respective effective pressure receiving areas which are the same as those of the respective pistons of the MCY used in the conventional brake system corresponding to this brake system 1.

In the brake system 1 structured as stated above, as the brake pedal 2 is pressed, the pedaling force on the brake pedal 2 is detected by the pedaling force detecting means 22 and inputted into the controller 21. The controller 21 closes the solenoid shut-off valves 19, 20 as soon as receiving a pedaling force detection signal and, at the same time, actuates the motor 13 to drive the pump 14 and then operate the brake fluid pressure control unit 16.

Then, the communication between the MCY 3 and the reservoir 4 is shut off so that a brake circuit (WCY side brake circuit) after the solenoid shut-off valves 19, 20 becomes in the sealed state. The brake fluid is supplied to this sealed brake circuit from the pump 14 through the brake fluid lines 17, 18. After the idle travels of the sealed brake circuit are absorbed (removed) with the brake fluid, brake fluid pressure P is developed in the WCYs 9, 10, 11, 12. The brake fluid pressure P is detected by the brake fluid pressure detecting means 23 and inputted into the controller 21. Then, the controller 21 controls the operation of the brake fluid pressure control unit 16 based on the pedaling force and the brake fluid pressure P whereby the brake fluid pressure control unit 16 controls the brake fluid pressure P to the value satisfying the equation (1).

With the brake fluid pressure P developed in the sealed brake circuit and controlled as stated above, the WCYs 9, 10, 11, 12 are actuated to perform the braking action. Though the brake fluid pressure P acts on the primary piston of the MCY 3, a force acting on the primary piston to oppose to the depression force ε applied by the brake lever to the primary piston is greater than the depression force ε because the brake fluid pressure P satisfies the equation (1). Therefore, the primary piston advances little, so the pedal stroke of the brake pedal 2 is quite short, i.e. nearly 0. In this manner, a vary short pedal stroke in a range from nearly 0 mm to about 15 mm is obtained which is much shorter than the pedal stroke of a general conventional brake pedal in a range from 60 mm to 80 mm. The idle travels of the WCYs 9, 10, 11, 12 are absorbed (removed) with the brake fluid introduced into the fluid pressure lines 7, 8 from the brake fluid lines 17, 18.

The respective characteristics of the brake system 1 are as follows. That is, the relation between the pedal travel and the pedaling force is, as shown in FIG. 2(*a*), a linear relation of a steep grade that the pedaling force is increased steeply by a slant increase in the pedal travel. As shown in FIG. 2(*b*), the relation between the pedal travel and the deceleration (i.e. brake fluid pressure) is also a linear relation of a steep grade that the deceleration (brake fluid pressure) is increased steeply by a slant increase in the pedal travel. As shown in FIG. 2(*c*), the relation between the pedaling force and the deceleration (brake fluid pressure) is a linear relation of a grade at 45° or nearly 45° that the increase in the pedal travel is equal or nearly equal to the increase in the deceleration (brake fluid pressure).

As a result of actual experiences, with the characteristics shown in FIG. 2(*a*) through FIG. 2(*c*), the deceleration (brake fluid pressure) responds to the increase/decrease of the pedaling force without any delay, thereby providing good operational feeling. However, no pedal stroke gives an insipid impression because the operation is too direct and thus gives no advanced-level impression, so a driver may feel something is missing. Therefore, as shown in FIGS. 2(*d*) and 2(*e*), the characteristics are set such that the pedaling force and the deceleration are increased in the same manner as the conventional one until the pedaling force and the deceleration reach predetermined values and, after that, the pedaling force and the deceleration are increased steeply by a slant increase of the pedal travel as shown in FIGS. 2(*a*) through 2(*c*). In this case, when the travel of the brake pedal for reaching the exchanging point, i.e. the rising point of the steep increase of the pedaling force or the deceleration, is too short, the driver may feel something is missing as mentioned above. On the other hand, when the travel for reaching the exchanging point is too long, the driver may easily feel the exchanging point and thus feel a sense of incongruity. Accordingly, the travel for reaching the exchanging point is preferably in a range from 7 mm to 15 mm. However, the travel is not limited thereto and may be from nearly 0 mm to more than 15 mm. However, the brake fluid pressure should be controlled relative to the pedaling force in such a manner that the relation between the pedaling force and the deceleration (brake fluid pressure) becomes a linear relation without the exchanging point as shown in FIG. 2(*f*). As stated above, the characteristics illustrated in FIGS. 2(*d*) through 2(*f*) give improved operational feeling with advanced-level impression as compared to the characteristics illustrated in FIGS. 2(*a*) through 2(*c*).

Though the solenoid shut-off valves 19, 20 are arranged on the reservoir 4 side with respect to the MCY 3 in FIG. 1, the solenoid shut-off valves 19, 20 may be arranged on the WCY side with respect to the MCY 3 and on the ways of the fluid pressure lines 7, 8 before the joints for the brake fluid lines 17, 18, as shown by dotted lines in FIG. 1. In this case, when the solenoid shut-off valves 19, 20 are operative, the communication between the MCY 3 and the reservoir 4 is not shut off so that the respective sealing portions of pistons 3*a*, 3*b* of the MCY 3 are required to pass openings for the brake fluid lines 5, 6. The travel of the brake pedal is slightly greater than that of the above mentioned case. However, since the fluid pressure chambers 3*e*, 3*f* of the MCY 3 and portions of the lines from the fluid pressure chambers 3*e*, 3*f* to the solenoid shut-off valves 19, 20 become in the sealed state after the sealing portions of the respective pistons 3*a*, 3*b* of the MCY 3 pass the openings for the brake fluid lines 5 and 6, the pressures in the fluid pressure chambers 3*e*, 3*f* are steeply increased and act on the pistons 3*a*, 3*b* of the MCY 3 to block the advances of the pistons 3*a*, 3*b* so that a brake system 1 has a very short stroke of a brake pedal as compared to a conventional one and has the braking characteristics just illustrated in FIGS. 2(*d*) through 2(*f*).

In this case, as the detection of the pedaling force, the detection of the MCY pressure P' developed in the MCY 3 is employed in addition to the case that the solenoid shut-off valves 19, 20 are arranged at the reservoir 4 side with regard to the MCY 3. The MCY pressure P' has a predetermined relation with the pedaling force and thus indicates the pedaling force. As stated above, since the relation between the pedaling force and the MCY pressure has hysteresis, it is impossible to achieve the completely linear control of the brake fluid pressure relative to the pedaling force. However, the MCY pressure is employed enough as the pedaling force for normal brake control without any trouble.

As a substitute for the single use of the pump 14, it is possible to use a combination of the pump 14 and an accumulator not shown for normally accumulating a predetermined fluid pressure at the discharge pressure of the pump 14. In this case, the pump 14 is controlled by the accumulated pressure of the accumulator, improving the response, particularly, in case of emergency operation of brake pedal 2.

Hereinafter, a description will be made as regard to the second principle of the brake system of the present invention. As shown in FIG. 3, the brake system 1 includes, besides the components of the brake system 1 shown in FIG. 1, pressure reducing valves 24, 25 arranged on the ways of the fluid pressure lines 7, 8 between the joints for the brake fluid lines 17, 18 and the MCY 3. Since these pressure reducing valves 24, 25 are well known in the art, the detail description about the construction of these valves will be omitted. The pressure reducing valves 24, 25 are adapted to set the fluid pressure P (i.e. the brake fluid pressure; the WCY pressure) in WCY-side portions 7*b*, 8*b* of the fluid pressure lines 7, 8 to be lower than the fluid pressure P' in MCY-side portions 7*a*, 8*a* of the fluid pressure lines 7, 8 (i.e. the MCY pressure) to give an equation (P<P'). Therefore, the reaction generated by the action of the MCY pressure on the pistons is set to be larger than the reaction to be generated in case that the brake fluid pressure acts on the pistons, preventing the brake fluid pressure from increasing too largely and thereby improving the durability of the brake system 1.

The relation between the pedaling force and the MCY pressure P' that is previously set is given by the following equation:

$$P' > (\epsilon - F\,spg)/A \qquad (2)$$

The other construction, other actions and effects of this brake system 1 are the same as those of the brake system 1 of the first principle shown in FIG. 1. Therefore, the brake system 1 of this case has substantially the same characteristics as shown in FIGS. 2(*d*) through 2(*f*). Because the brake fluid pressure is slightly lower than that of the first principle, the characteristic shown in FIG. 2(*e*) has an inclination gentler than that in case of the first principle and the characteristic shown in FIG. 2(*f*) has also an inclination gentler than that in case of the first principle.

Hereinafter, a description will be made as regard to the third principle of the brake system of the present invention.

Though the effective pressure receiving areas of the pistons 3*a*, 3*b* of the MCY are the same as those of the conventional one, respectively, in the aforementioned brake system 1 of the first or second principle, the effective pressure receiving areas of the pistons 3*a*, 3*b* of the MCY 3 are set to be larger than those of the conventional one, in the brake system 1 of the third principle. That is, the following equation is given.

$$A > (\epsilon - F\ spg)/P = A' \qquad (3)$$

In the equation (3), the depression force E and the spring force F spg of the return spring and the brake fluid pressure P are set in the conventional manner of a normal brake system and the effective pressure receiving area A' of the piston of the conventional MCY is set based on these values.

The other construction, other actions and effects of this brake system 1 of the third principle are the same as those of the brake system 1 shown in FIG. 1.

As mentioned above, the reaction generated by the action of the brake fluid pressure to the pistons is set to be larger than that in the conventional brake system by that the effective pressure receiving areas of the pistons 3*a*, 3*b* of the MCY 3 are set to be larger than the effective pressure receiving area A' of the pistons of the conventional MCY, just like the second principle, without the pressure reducing valves of the second principle shown in FIG. 3, preventing the brake fluid pressure from increasing too largely and thereby improving the durability of the brake system 1.

Therefore, the brake system 1 of this case also has substantially the same characteristics as shown in FIGS. 2(*d*) through 2(*f*). Because the brake fluid pressure is slightly lower than that of the first principle, the characteristic shown in FIG. 2(*e*) has an inclination gentler than that in case of the first principle and the characteristic shown in FIG. 2(*f*) has also an inclination gentler than that in case of the first principle.

Hereinafter, a description will now be made as regard to an embodiment for carrying out the brake system according to the present invention based on these principles.

FIG. 4 is a diagram schematically showing an example of the embodiment of the brake system according to the present invention. It should be noted that parts similar or corresponding to the parts shown in FIGS. 1 and 3 will be marked by the same reference numerals so that the description about the parts will be omitted. The same is true for the description of the following other embodiments, so parts similar or corresponding to the parts of preceding embodiments will be marked by the same reference numerals.

As shown in FIG. 4, the brake system 1 of this embodiment is the one based on the first principle shown in FIG. 1 in which the solenoid shut-off valves 19, 20 are arranged on the ways of the fluid pressure lines 7, 8 as shown by the dotted lines in FIG. 1.

In this brake system 1, the brake fluid pressure control unit 16 is composed of four normally closed solenoid shut-off valves 26, 27; 28, 29, two of which are for the first brake circuit and the other two of which are for the second brake circuit. In this case, the solenoid shut-off valves 26, 28 are arranged on the ways of the brake fluid lines 17, 18 and the solenoid shut-off valves 27, 29 are arranged on the ways of return lines 30, 31 connecting the WCYs 9, 10; 11, 12 and the reservoir 4.

As the pedaling force detecting means 22, two fluid pressure sensors 22*a*, 22*b* are provided on the fluid pressure lines 7, 8 between the MCY 3 and the solenoid shut-off valves 19, 20, respectively. These fluid pressure sensors 22*a*, 22*b* are adapted to detect the MCY pressure in the respective brake circuits. As the brake fluid pressure detecting means 23, two fluid pressure sensors 23*a*, 23*b* are provided on the fluid pressure lines 7, 8 after the joints for the brake fluid lines 17, 18 and before the WCYs 9, 10, 11, 12.

Though the controller 21 and the motor 13 for driving the pumps 14*a*, 14*b* are not shown in FIG. 4, the brake system 1 of the embodiment has the controller 21 and the motor 13 just like the case shown in FIG. 1. The motor 13, the solenoid shut-off valves 19, 20, 26, 27, 28, 29, and the fluid pressure sensors 22*a*, 22*b*, 23*a*, 23*b* are connected to the controller 21 so that the controller 21 controls the motor 13 and the solenoid shut-off valves 19, 20, 26, 27, 28, 29 based on the fluid pressures detected by the fluid pressure sensors 22*a*, 22*b*, 23*a*, 23*b*, in such a manner as to control the brake fluid pressure to correspond to the pedaling force according to the predetermined relation between the pedaling force and the brake fluid pressure.

The other constructions of the brake system 1 of the embodiment are the same as those of the brake system 1 shown in FIG. 1.

In the brake system of the embodiment structured as mentioned above, the normally open solenoid shut-off valves 19, 20 are in the open positions and the normally closed solenoid shut-off valves 26, 27, 28, 29 are in the close positions when the brake system is inoperative.

As the braking operation is performed by the press of the brake pedal 2, the MCY 3 develops MCY pressure so that the MCY pressure is detected by the fluid pressure sensors 22*a*, 22*b* and outputted to the controller 21. The controller 21 closes the solenoid shut-off valves 19, 20 and actuates the motor 13 to drive the pumps 14*a*, 14*b*, as explained with regard to the first principle, and, in addition, opens the normally closed solenoid shut-off valves 26, 28. Then, the communication between the MCY 3 and the WCYs 9, 10, 11, 12 is shut off and the brake fluid in the reservoir 4 is sent to the fluid pressure lines 7, 8 between the solenoid shut-off valves 19, 20 and the WCYs 9, 10, 11, 12 via the solenoid shut-off valves 26, 28 and the brake fluid lines 17, 18 by the pumps 14*a*, 14*b*. At this point, the solenoid shut-off valves 19, 20 are closed so that the brake fluid is prevented from flowing to the MCY 3 and the reservoir 4, thereby increasing the fluid pressures in the fluid pressure lines 7, 8. That is, the discharge pressure of the pumps is introduced as the brake fluid pressure into the fluid pressure lines 7, 8 between the solenoid shut-off valves 19, 20 and the WCYs 9, 10, 11, 12. In this manner, the brake fluid pressure is introduced to the WCYs 9, 10, 11, 12, performing the braking action.

During this, the controller 21 controls the brake fluid pressure according to the relation between the pedaling force and the brake fluid pressure, based on the pedaling force converted from the MCY pressure detected by the fluid pressure sensors 22*a*, 22*b* and the brake fluid pressures detected by the fluid pressure sensors 23*a*, 23*b*. Concretely, when the brake fluid pressure becomes larger than the value corresponding to the relation between the pedaling force and the brake fluid pressure, the controller 21 opens the normally closed solenoid shut-off valves 27, 29 to release the brake fluid pressure to the reservoir 4 so as to decrease the brake fluid pressure to correspond to the aforementioned relation. When the brake fluid pressure becomes lower than the valve corresponding to the aforementioned relation, the controller 21 closes the normally closed solenoid shut-off valves 27, 29 so as to increase the brake fluid pressure to correspond to the aforementioned relation.

On the other hand, the pedal stroke for the braking operation is a vary short pedal stroke in a range from nearly 0 mm to about 15 mm as explained with regard to the first principle. That is, the respective characteristics of this brake system 1 are substantially the same as shown in FIGS. 2(*d*) through 2(*f*).

As the brake pedal 2 is released, the brake pedal 2 and the pistons 3a, 3b of the MCY 3 return to their inoperative positions. Since the pistons 3a, 3b of the MCY 3 return to their inoperative positions, the fluid pressure chambers 3e, 3f of the MCY 3 communicate with the reservoir 4 so as to cancel the MCY pressure. Then, the controller 21 determines that the pedaling force is 0 and therefore opens the solenoid shut-off valves 19, 20, stops the motor 13 i.e. stops the pumps 14a, 14b, and further closes the solenoid shut-off valves 26, 27, 28, 29. In this manner, the brake system 1 becomes in the inoperative state as illustrated. Accordingly, the pressurized fluid in the WCYs 9, 10, 11, 12 is returned to the reservoir 4 through the fluid pressure lines 7, 8, the MCY 3, and the brake fluid lines 5, 6 so that the brake fluid pressure goes out, thus canceling the brakes.

In case of the motor 13, the pumps 14a, 14b, or the controller 21 failure, the solenoid shut-off valves 19, 20, 26, 27, 28, 29 are held in the illustrated state. In this case, as the brake pedal 2 is pressed, the MCY 3 is actuated to develop the MCY pressure, the MCY pressure is introduced as the brake fluid pressure into the WCYs 9, 10, 11, 12, thus performing the braking action in the same manner as the conventional brake system. The pedal stroke in this case is the same as the pedal stroke of the conventional brake system and is not shortened.

As mentioned above, according to the brake system 1 of the embodiment, the very short pedal stroke can be obtained.

Though the MCY pressure is detected as the pedaling force in the brake system 1 of the embodiment, detected as the pedaling force includes, of course, the pedaling force itself applied by a driver to the brake pedal 2 and various forces as stated with regard to the first principle.

Though various concrete examples are made based on the second principle and the third principle, the description of these examples will be omitted because these examples do not indicate directly the construction of the present invention.

By the way, the inventor of the present invention has been studied about the above-mentioned three factors for obtaining the optimal brake characteristics in the brake system 1 with the very short pedal stroke. The following experiments were made with an actual vehicle in which the brake system 1 with the very short pedal stroke is installed. The results are as follows. From these results, the optimal brake characteristics, as will be stated later, can be developed newly.

1. Brake Characteristics and Linear Characteristic (i) Brake characteristics between the pedaling force and the deceleration (brake fluid pressure) of a vehicle Normally, the driver is not conscious of pressing the brake pedal 2 until the pedaling force reaches about 25N. If a deceleration higher than 0.1G is developed before the pedaling force reaches 25N, the driver feels difficulties of controlling, so the driver dislikes such condition.

With the linear brake characteristics in which a deceleration of 0.1G is developed with a pedaling force of 10N, the braking action should be too sharp. In this case, the driver may become nervous about his or her pedaling operation because even a small pedaling force produces a large deceleration and the pedal feeling is thus not good. With the brake characteristics in which a deceleration of 0.1G is developed with a pedaling force of 30N, the braking action should be too dull. In this case also, the pedal feeling is not good.

From the above, the brake characteristics in which a deceleration of 0.1G is developed with a pedaling force of 15–25N are the best for the braking sharpness and the pedal feeling.

(ii) Brake characteristics between the travel of a brake pedal and the pedaling force/ the deceleration (brake fluid pressure) of a vehicle The shorter the pedal stroke is, the lighter the driver's braking operation is, because a part of the movement of the driver is omitted by the shortened stroke. However, no pedal stroke gives an impression just like stepping on a board, so the pedal feeling is not good and the operational facility is also not good. As a result of experiments, the brake characteristics in which a deceleration of 0.1G is developed with a pedaling force of 20N and a travel of the brake force of 7–15 mm are excellent for the pedal feeling and the operational facility. With the aforementioned brake characteristics and a pedal stroke of 5 mm, the deceleration should be too sharp at the start of pedaling so that the operational facility is bad. On the other hand, with the aforementioned brake characteristics and a pedal stroke of 20 mm, the driver should feel the exchanging point of the relation between the travel of the brake pedal and the deceleration (the brake fluid pressure) of a vehicle (the point where steep increase of the brake fluid pressure relative to the travel of the brake pedal is started) so that the pedal feeling is not good and the driver's braking operation is not so facilitated. It should be noted that when the spring constant is set to 2N/mm or less, the driver feels the exchanging point even with any brake characteristics.

From the above, with the brake characteristics in which a deceleration of 0.1G is developed with a pedaling force of 15–25N, the pedal stroke of 7–15 mm is good.

(iii) Brake characteristics between the pedaling force/ the travel of a brake pedal and the deceleration (the brake fluid pressure) of a vehicle With the brake characteristics in which the brake pedal travels 10 mm with a pedaling force of 15–25N and with a deceleration of 0.15G, the braking action is too sharp and the operational facility is not good (because too large jumping is developed at the output rising point in the input/output characteristics of the brake system). On the other hand, with this brake characteristics and a deceleration of 0.04G, the braking action is too dull so that the driver feels heavy pedaling.

From the above, with the brake characteristics having the pedal travels 10 mm with a pedaling force of 15–25N, the deceleration of the vehicle is preferably 0.08–0.12G.

(iv) Rising pattern for the optimal brake characteristics

From the above (i) through (iii), the rising pattern for the optimal brake characteristics is preferably set to have a characteristic point with a deceleration of 0.08–0.12G when the pedaling force is 15–25N, the travel of the brake pedal is 7–15 mm, and to prevent the travel of the brake pedal from exceeding the pedal stroke. Particularly, the preferable rising pattern is a pattern A shown by a solid line in FIG. 5 having the characteristic point with a deceleration of 0.1G, when the pedaling force is 20N and the travel of the brake pedal is 10 mm. In addition, a pattern B (jumping pattern B) is also preferable when a jumping function of a predetermined amount (for example, 0.05G or any amount can be set) is provided at the rising point of the deceleration so that when the travel of the brake pedal reaches the rising point of the deceleration, a predetermined deceleration is developed, thereby improving the braking action at the starting of braking. In this case, the inclination of a line for the jumping pattern B is set to be the same as the inclination of a line passing through the characteristic point for the aforementioned pattern A. When the amount of jumping function is too large, the braking action may be too sharp. Therefore, it is preferable that the amount of jumping function is suitably set. The pattern A and the jumping pattern B are obtained by that the closing timing of the solenoid shut-off valves 19, 20 and the brake fluid pressure control unit 16 are controlled by the controller.

If the line of the characteristics between the pedaling force and the deceleration of the vehicle is not linear and is curved downwardly, the driver may feel that the braking is dull. On the other hand, if the line of the characteristics is curved upwardly, the driver may feel that the braking is too sharp. The linear characteristics between the pedaling force and the deceleration give good operational feeling, while the curved characteristics give bad operational feeling.

Moreover, the characteristics between the pedaling force and the deceleration after the characteristic point (e.g. the deceleration of 0.1G) are preferably linear. In particular, the line of the characteristics is preferably set to connect the characteristic point with a pedaling force 20N and a deceleration 0.1G and a point with a pedaling force 200N and a deceleration 1G. It should be understood that this linear characteristics are also obtained by that the brake fluid pressure control unit 16 is controlled by the controller 21.

Figure 6:
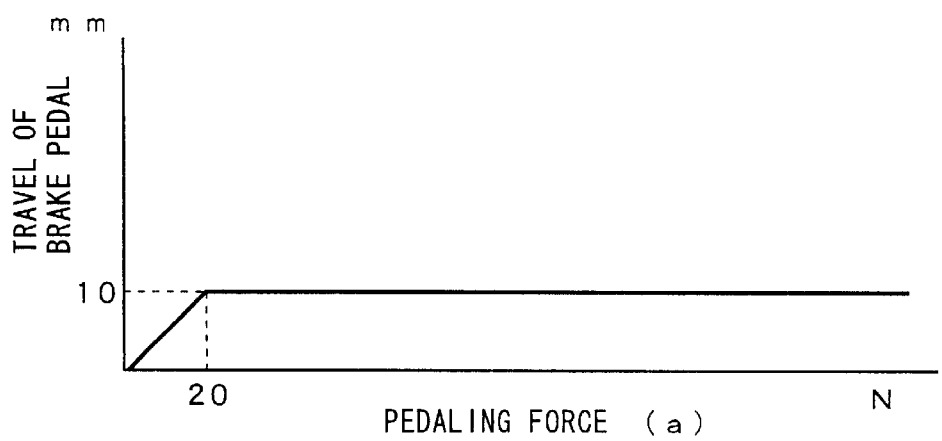
FIG. 6 is a graph showing a pedaling force-pedal travel characteristic among the brake characteristics according to the present invention.

The brake pedal 2 is controlled to travel to the characteristic point (e.g. the deceleration of 0.1G) and not to further travel as shown in FIG. 6. This control is done by that the closing timing of the solenoid shut-off valves 19, 20 is controlled. In this case, the linear or curved characteristics between the pedaling force and the deceleration before the characteristic point do not influence the braking action, the operational feeling, and the feeling of pedaling.

2. Operational Response (i) Brake characteristics suitable for a vehicle

The response varies according to vehicles. The following countermeasures are required for corresponding to the response varied according to the vehicles when set to obtain the brake characteristics as stated above (iv).

1) In case of a vehicle having oversensitive response in the low G range, the braking action should be too sharp with the brake characteristics stated above 1 (iv), so the braking feeling and the operational facility become bad.

Therefore, the pedaling force is set to be 20N or more at the rising point in the brake characteristics stated above 1, (iv) (at a deceleration 0.08–0.12G), thereby preventing the braking action from being too sharp, improving the braking feeling and the operational facility, and optimizing the feeling of response.

2) In case of a vehicle having insensitive response in the low G range, the braking action should be too dull with the brake characteristics stated above 1, (iv), so the braking feeling and the operational facility become also bad.

Therefore, the pedaling force is set to be 20N or less at the rising point in the brake characteristics stated above 1, (iv), thereby preventing the braking action from being too dull, improving the braking feeling and the operational facility, and optimizing the feeling of response.

(ii) Response

With respect to the countermeasures as stated above (i) for the brake characteristics according to the vehicle, the response particularly influences in case that the speed of pressing the brake pedal is high.

The speed (da/dt) of increase in the pedaling force in the low G range is detected and the speed of increase of the deceleration G is changed to correspond to the speed of increase of the pedaling force. Concretely, the speed of increase in the deceleration G is changed by a method which comprises calculating a target deceleration relative to the pedal force and using this target deceleration, as described below:

1) When the speed of increase in the pedaling force exceeds a predetermined value, the speed of increase in the deceleration G is changed.

a) In case of oversensitive response: the speed of increase in the deceleration G is set lower.

b) In case of insensitive response: the speed of increase in the deceleration G is set higher.

c) Measures for changing the speed of increase in the deceleration G.

The followings are the measures of changing the speed of increase in the deceleration G:

Changing the arithmetic value for pedaling force (for example, the arithmetic value is decreased as the speed of increase in the pedaling force is higher).

Changing the inclination of the characteristics between the pedaling force a and the deceleration G.

2) The speed of increase in the deceleration G is changed according to the speed of increase in the pedaling force a For example, a correction factor is given according to the speed of increase in the pedaling force a and the desired deceleration is multiplied by the correction factor to obtain a suitable desired deceleration.

(iii) Build-up feeling

Build-up feeling can be obtained by slightly increasing the braking force at the end of braking action to give an impression of sharp braking action to the driver.

As the response of the brakes is decreased a little, the build-up feeling is generated and the pedal feeling becomes mild. When the speed of increase (da/dt) in the pedaling force becomes a predetermined value or lower, the build-up feeling (the deceleration G is increased by a predetermined value) is provided.

3. Brake Characteristics Suitable for the Vehicle Speed

As the characteristics between the pedaling force a and the deceleration G is set constant, the braking action may be too sharp or too dull according to the vehicle speed. For example, as the brake characteristics are set suitable for a case that the vehicle runs at a middle speed (40–60 km/h), the braking action at a low speed (10–20 km/h) is too sharp and the braking action at a high speed (80–100 km/h) is too dull.

Therefore, it is preferable that the characteristics between the pedaling force a and the deceleration G are changed according to the vehicle speed.

(i) The inclination of the linear characteristics between the pedaling force a and the deceleration G is changed according to the vehicle speed.

Figure 5:
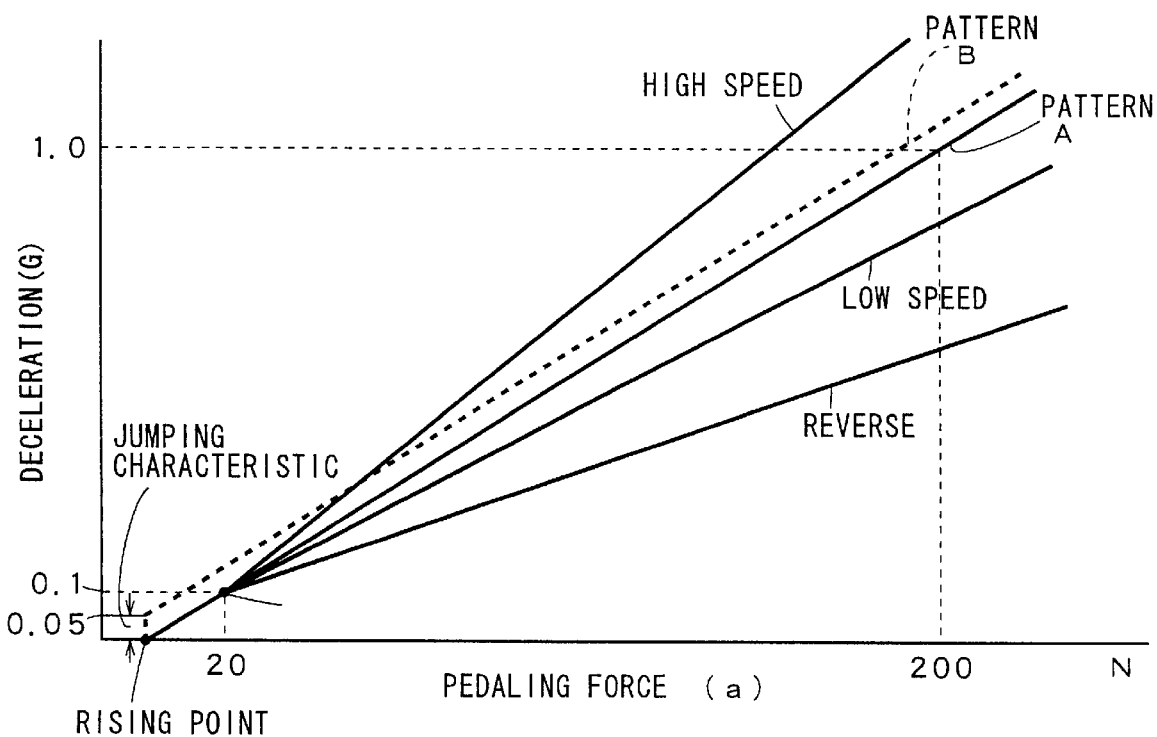
FIG. 5 is a graph showing a pedaling force-deceleration characteristic among the brake characteristics according to the present invention.

Concretely, an increased inclination is set for a high vehicle speed, and a decreased inclination is set for a low vehicle speed as shown in FIG. 5. For the reverse running of the vehicle, an inclination gentler than that for the low vehicle speed is set.

(ii) The amount of build-up between the pedaling force a and the deceleration G is changed according to the vehicle speed.

Figure 7:
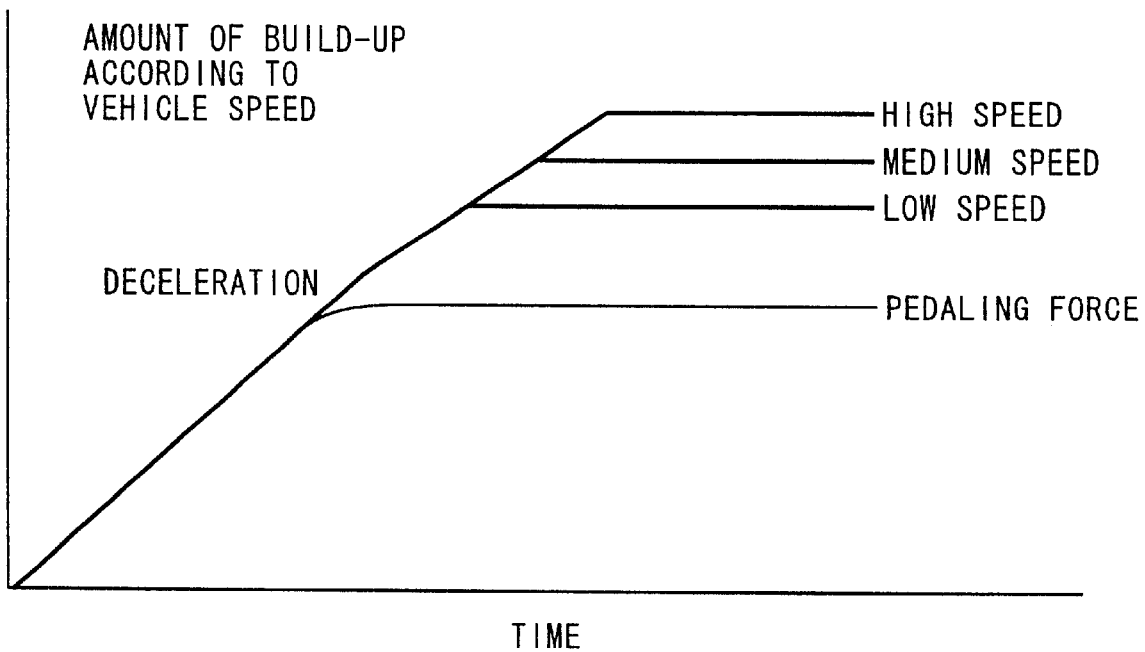
FIG. 7 is a graph for explaining variation in amount of the build-up corresponding to the vehicle speed, among the brake characteristics according to the present invention.

Concretely, an increased amount of build-up is set for a high vehicle speed and a decreased amount of build-up is set for a lower vehicle speed as shown in FIG. 7.

(iii) The inclination (relative to time) of build-up between the pedaling force a and the deceleration G is changed according to the vehicle speed.

Figure 8:
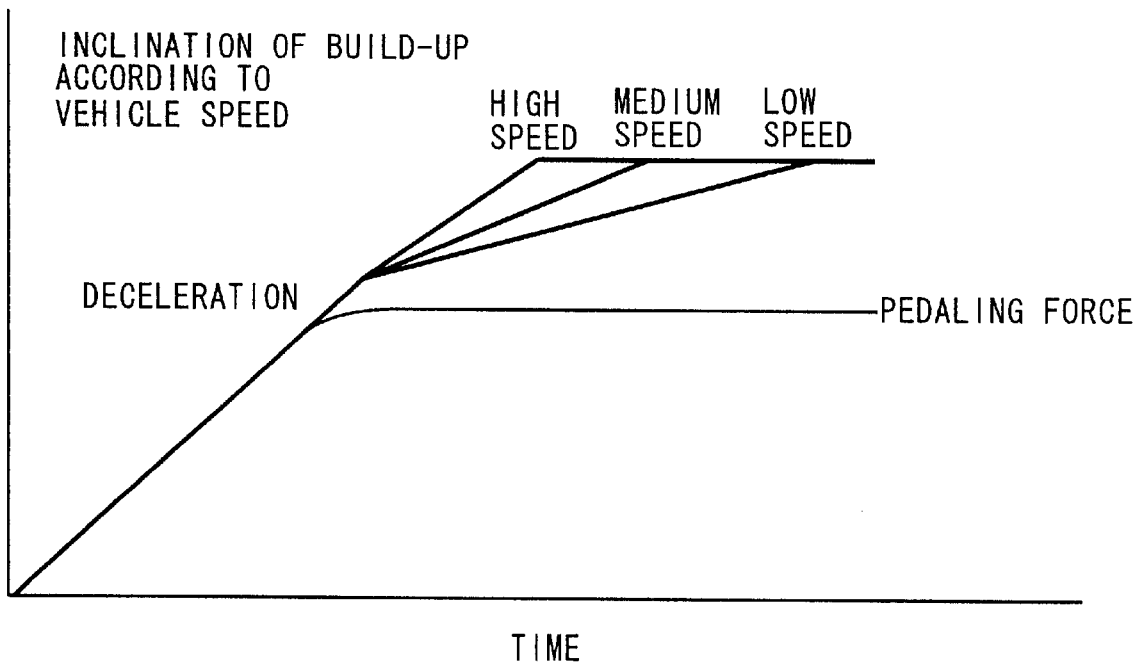
FIG. 8 is a graph for explaining variation in inclination of the build-up corresponding to the vehicle speed, among the brake characteristics according to the present invention.

Concretely, an increased inclination of build-up is set for a high vehicle speed, and a decreased inclination of build-up is set for a low vehicle speed as shown in FIG. 8.

In this manner, the brake characteristics can be changed according to the vehicle speed, thereby obtaining the optimal brake characteristics. 4. Brake characteristics during the vehicle runs in reverse In case of reverse operation, for example, for putting the vehicle in a garage, the driver may watch the back of the vehicle with pressing the brake pedal. In this case, the driver may abnormally strongly press the brake pedal 2 and therefore it is hard to stop smoothly the vehicle. Since the brake system of this invention has a very short stroke, it is particularly difficult to stop smoothly the vehicle.

Therefore, the following settings are employed for the reverse operation.

(i) When a gear of a transmission is in a reverse position:
A decreased inclination of the characteristics between the pedaling force a and the deceleration G is set as shown in FIG. 5 (for example, while the normal operation is set such that a deceleration 1G is developed at a pedaling force 200N, the reverse operation is set such that a deceleration 1G is developed at a pedaling force 300N).

(ii) When the gear of the transmission is in the reverse position:
The arithmetic value is decreased.

(iii) When the gear of the transmission is in the reverse position:
The closing timing of the solenoid shut-off valves 19, 20 for shutting off the MCY is delayed (this makes the pedal stroke longer, lightening the strong pedaling force).

As apparent from the above, according to the brake system of the present invention, the very short pedal stroke can be obtained, thereby improving the feeling of braking.

Since the brake characteristics including the braking sharpness, the feeling of response, and the feeling of pedaling are set according to three factors: the pedal characteristics, the travel of the brake pedal, and the deceleration (brake fluid pressure) of the vehicle, the optimal brake characteristics can be obtained.

What is claimed is:

1. A brake system comprising:

a brake pedal, a reservoir for storing brake fluid, a master cylinder operated by said brake pedal for developing fluid pressure and having a pressure chamber, brake cylinders actuated by the fluid pressure of said master cylinder, an electromagnetic shut-off valve disposed between the pressure chamber of the master cylinder and the reservoir, brake fluid supply means for supplying brake fluid to lines between the brake cylinders and the pressure chamber of the master cylinder, brake fluid pressure control means for controlling the fluid pressure in the brake cylinders, and a central processor electrically connected to the electromagnetic shut-off valve, the brake fluid supply means and the brake fluid pressure control means for controlling the same, said central processor, when the brake pedal is depressed, controlling the electromagnetic shut-off valve and the brake fluid pressure control means in such a manner as to obtain a preset pedal force/pedal travel characteristic, and controlling the brake fluid supply means and the brake fluid pressure control means in such a manner as to obtain a preset pedal force/vehicle deceleration characteristic, said pedal force/pedal travel characteristic having a characteristic point where a pedal travel is 7–15 mm while a pedal force is 15–25N, and said pedal force/vehicle deceleration characteristic having a characteristic point where a vehicle deceleration is 0.08–0.12G while the pedal force is 15–25N.

2. A brake system as claimed in claim 1, wherein said pedal force/vehicle deceleration characteristic includes a jumping characteristic in which a predetermined vehicle deceleration is set relative to the pedal force at a rising point of the vehicle deceleration.

3. A brake system as claimed in claim 1, wherein said pedal force/vehicle deceleration characteristic includes a linear characteristic, after said characteristic point, in which the vehicle deceleration varies linearly in proportion to the pedal force.

4. A brake system as claimed in claim 1, wherein said pedal force/pedal travel characteristic includes a pedal travel which is constant relative to the pedal force after said characteristic point.

5. A brake system as claimed in claim 4, wherein said characteristic point of said pedal force/vehicle deceleration characteristic is such that the vehicle deceleration is 0.1G while the pedal force is 20N and includes a linear characteristic, after the above mentioned characteristic point, indicated by a straight line extending from the characteristic point through a point where the vehicle deceleration is 1G and the pedal force is 200N.

6. A brake system as claimed in claim 1, wherein in case of a vehicle having an oversensitive response in a low deceleration range before a characteristic point where the vehicle deceleration is in a range of 0.08 to 0.12G, said pedal force/vehicle deceleration characteristic has a pedal force not less than 20N at the above mentioned characteristic point.

7. A brake system as claimed in claim 1, wherein in case of a vehicle having an insensitive response in a low deceleration range before a characteristic point where the vehicle deceleration is in a range of 0.08 to 0.12G, said pedal force/vehicle deceleration characteristic has a pedal force less than 20N at the above mentioned characteristic point.

8. A brake system as claimed in claim 1, wherein in case the vehicle has an oversensitive response when a speed of increase in the pedal force is higher than a predetermined value, a vehicle deceleration is slowed relative to an increase in the pedal force, and in case the vehicle has an insensitive response, the vehicle deceleration is speeded up relative to the increase in the pedal force.

9. A brake system as claimed in claim 8, wherein in order to change the speed in the vehicle deceleration, a vehicle deceleration relative to the pedal force is calculated by changing an arithmetic value for a pedal force, or changing an inclination of a curve indicating the pedal force/vehicle deceleration characteristic.

10. A brake system as claimed in claim 3, wherein an inclination of a curve indicating said pedal force/vehicle deceleration characteristic is changed after said characteristic point according to the vehicle speed.

11. A brake system as claimed in claim 1, wherein said pedal force/vehicle deceleration characteristic is provided with a build-up characteristic such that the vehicle deceleration is promoted by a predetermined amount when the increase in the pedal force is stopped and retained at a predetermined value.

12. A brake system as claimed in claim 11, wherein a build up amount for promoting the vehicle deceleration is changed for a predetermined amount according to the vehicle speed.

13. A brake system as claimed in claim 11, wherein the speed for promoting the vehicle deceleration is changed to a predetermined valve according to the vehicle speed.

14. A brake system comprising:

a brake pedal, a reservoir for storing brake fluid, a master cylinder operated by said brake pedal for developing fluid pressure and having a pressure chamber, brake cylinders actuated by the fluid pressure of said master cylinder, an electromagnetic shut-off valve disposed between the pressure chamber of the master cylinder and the brake cylinders, brake fluid supply means for supplying brake fluid to lines between the electromagnetic shut-off valve and the brake cylinders, brake fluid pressure control means for controlling the fluid pressure at the brake cylinders, and a central processor electrically connected to the electromagnetic shut-off valve, the brake fluid supply means and the brake fluid pressure control means for controlling the same, said central processor, when the brake pedal is depressed, controlling said electromagnetic shut-off valve and said brake fluid pressure control means in such a manner as to obtain a preset pedal force/pedal travel characteristic, and controlling said brake fluid supply means and said brake fluid pressure control means in such a manner as to obtain a preset pedal force/vehicle deceleration characteristic, said pedal force/pedal travel characteristic having a characteristic point where a pedal travel is 7–15 mm while a pedal force is 15–25N, and said pedal force/vehicle deceleration characteristic having a characteristic point where a vehicle deceleration is 0.08–0.12G while the pedal force is 15–25N.

15. A brake system as claimed in claim 14, wherein said pedal force/vehicle deceleration characteristic includes a jumping characteristic in which a predetermined vehicle deceleration is set relative to the pedal force at a rising point of the vehicle deceleration.

16. A brake system as claimed in claim 14, wherein said pedal force/vehicle deceleration characteristic includes a linear characteristic, after said characteristic point, in which the vehicle deceleration varies linearly in proportion to the pedal force.

17. A brake system as claimed in claim 14, wherein said pedal force/pedal travel characteristic includes a pedal travel which is constant relative to the pedal force after said characteristic point.

18. A brake system as claimed in claim 14, wherein in case the vehicle has an oversensitive response when a speed of increase in the pedal force is higher than a predetermined value, a vehicle deceleration is slowed relative to an increase in the pedal force, and in case the vehicle has an insensitive response, the vehicle deceleration is speeded up relative to the increase in the pedal force.

19. A brake system as claimed in claim 14, wherein said pedal force/vehicle deceleration characteristic is provided with a build-up characteristic such that the vehicle deceleration is promoted by a predetermined amount when the increase in the pedal force is stopped and retained at a predetermined value.

20. A brake system comprising:

a brake pedal, a reservoir for storing brake fluid, a master cylinder operated by said brake pedal for developing fluid pressure and having a pressure chamber, brake cylinders actuated by the fluid pressure of said master cylinder, a first electromagnetic shut-off valve disposed between the pressure chamber of the master cylinder and the reservoir, a second electromagnetic shut-off valve disposed between the pressure chamber of the master cylinder and the brake cylinders, brake fluid supply means for supplying brake fluid to lines between the second electromagnetic shut-off valve and the brake cylinders, brake fluid pressure control means for controlling the fluid pressure at the brake cylinders, and a central processor for controlling the first and second electromagnetic shut-off valves, the brake fluid supply means, and the brake fluid pressure control means, said central processor, when the brake pedal is depressed, controlling said first and second electromagnetic shut-off valves in such a manner as to obtain a preset pedal force/pedal travel characteristic, and controlling said brake fluid supply means and said brake fluid pressure control means in such a manner as to obtain a preset pedal force/vehicle deceleration characteristic, said pedal force/pedal travel characteristic having a characteristic point where a pedal travel is 7–15 mm while a pedal force is 15–25N, and said pedal force/vehicle deceleration characteristic having a characteristic point where a vehicle deceleration is 0.08–0.12G while the pedal force is 15–25N.

* * * * *